United States Patent [19]

Dennis et al.

[11] Patent Number: 5,014,882
[45] Date of Patent: May 14, 1991

[54] PIVOT-ACTION PORTIONING APPARATUS AND METHOD

[75] Inventors: Wendell E. Dennis; Steven M. Sheeley, both of Overland Park, Kans.; Stephen M. Brown, Raytown, Mo.; Kevin A. Washam, Belton, Mo.; Lewis E. Alley, Kansas City, Mo.; Marvin D. Cain, Olathe, Kans.

[73] Assignee: Marlen Research Corporation, Overland Park, Kans.

[21] Appl. No.: 354,156

[22] Filed: May 19, 1989

[51] Int. Cl.⁵ .............................................. G01F 11/06
[52] U.S. Cl. .................................... 222/309; 222/148; 222/389; 222/452; 92/142; 452/43
[58] Field of Search ........ 222/160, 309, 334, 386–389, 222/450–452, 148; 92/128, 142, 143; 17/39

[56] References Cited

U.S. PATENT DOCUMENTS

| | | |
|---|---|---|
| 23,948 | 5/1859 | Roberts et al. . |
| 2,231,357 | 2/1941 | Burghauser et al. . |
| 2,615,199 | 10/1952 | Fuller . |
| 2,693,348 | 11/1954 | Ellermann . |
| 2,698,962 | 1/1955 | Swallow . |
| 3,060,512 | 10/1962 | Martin et al. . |
| 3,070,836 | 1/1963 | Haven et al. . |
| 3,082,816 | 3/1963 | Skidmore . |
| 3,114,171 | 12/1963 | Colombo . |
| 3,143,767 | 8/1964 | Wirth et al. . |
| 3,189,233 | 6/1965 | Wilson et al. .................. 222/452 |
| 3,195,868 | 7/1965 | Loomans et al. . |
| 3,198,491 | 8/1965 | Loomans et al. . |
| 3,341,076 | 9/1967 | Wasilewski et al. ............. 222/309 |
| 3,359,725 | 12/1967 | Maier .................................. 92/142 |
| 3,423,074 | 1/1969 | Loomans . |
| 3,463,459 | 8/1969 | Loomans et al. . |
| 3,525,124 | 8/1979 | Ocker . |
| 3,601,845 | 8/1971 | Mavrich ............................ 222/309 |
| 3,605,188 | 9/1971 | McCormick et al. . |
| 3,640,669 | 2/1972 | Hanslik . |
| 3,685,554 | 8/1972 | Encke ................................ 222/309 |
| 3,779,522 | 12/1973 | Loomans . |
| 3,883,122 | 5/1975 | Werner . |
| 3,904,719 | 9/1975 | Fritsch . |

(List continued on next page.)

FOREIGN PATENT DOCUMENTS 1274797 4/1965 Fed. Rep. of Germany .
410969 1/1974 U.S.S.R. .

Primary Examiner—H. Grant Skaggs
Assistant Examiner—Steve Reiss
Attorney, Agent, or Firm—Hovey, Williams, Timmons & Collins

[57] ABSTRACT

A volumetric apparatus for portioning fluidic material into fractions of predetermined size includes a housing having an inlet and an outlet, and a piston movable in the housing and defining a product portioning chamber and a compression chamber. Fluidic material is fed into the product portioning chamber through the inlet under pressure when the inlet is open and the outlet is closed, the pressurized fluidic material forcing the piston from a first position by a preset distance such that a predetermined volume of the fluidic material is fed into the product portioning chamber. Thereafter, the piston is driven from the second position to the first position when the inlet is closed and the outlet is open so as to deliver the portioned fluidic material from the product portioning chamber through the outlet. A storage chamber is provided which is in communication with the compression chamber so the pneumatic fluid is transferred from the compression chamber to the storage chamber under pressure when the piston is forced from the first position to the second position and is transferred from the storage chamber to the compression chamber under pressure when the inlet is closed and the outlet is open, thus driving the piston to the first position as the fluid is transferred under pressure to the compression chamber. The housing may be lifted from the valve to facilitate cleaning of the valve and housing when the portioning operation is complete, and a method of carrying out the portioning operation is also disclosed.

14 Claims, 3 Drawing Sheets

U.S. PATENT DOCUMENTS

| | | |
|---|---|---|
| 3,917,507 | 11/1975 | Skidmore . |
| 4,025,058 | 4/1977 | Mizuguchi . |
| 4,026,192 | 5/1977 | Noren et al. .......................... 92/143 |
| 4,084,729 | 4/1978 | Epple ................................. 222/309 |
| 4,136,251 | 1/1979 | Bice et al. . |
| 4,136,968 | 1/1979 | Todd . |
| 4,185,123 | 1/1980 | Wenger et al. . |
| 4,218,146 | 8/1980 | Housz . |
| 4,293,010 | 10/1981 | Winiasz ............................... 222/309 |
| 4,311,086 | 1/1982 | Schoen ................................ 92/143 |
| 4,355,734 | 10/1982 | Moore ................................. 222/389 |
| 4,423,960 | 1/1984 | Anders . |
| 4,454,804 | 6/1984 | McCulloch . |
| 4,474,473 | 10/1984 | Higuchi et al. . |
| 4,514,148 | 4/1985 | Topinka ............................... 92/143 |
| 4,566,273 | 1/1986 | Baumeler ............................. 92/143 |

PIVOT-ACTION PORTIONING APPARATUS AND METHOD

BACKGROUND OF THE INVENTION

1. Field of the Invention

The present invention relates generally to volumetric portioning devices and, more particularly, to an apparatus for portioning fluidic material such as foodstuffs and the like into rations of predetermined size.

2. Description of the Prior Art

It is known to provide a measuring cylinder having an inlet valve and an outlet valve which are alternately operated with the goal of regulating the flow of foodstuffs and the like through the cylinder in order to divide the material into equally sized portions which may then be delivered to a packaging station downstream of the cylinder. However, numerous drawbacks exist in the known construction which result in the device being difficult to clean and expensive to build and operate.

For example, in the known construction, because a separate valve is provided at the inlet and outlet of the measuring cylinder, timing of the opening and closing operations carried out with each of the valves must be precisely coordinated in order to avoid improper feeding of material into and out of the cylinder. In addition, the use of two valves represents a duplication of parts which increases the cost and complexity of the cylinder device as well as the opportunity for malfunctions.

Another disadvantage in the known construction, which also arises from the use of numerous elements, is that when the device is broken down for cleaning, many of the elements are loose, i.e. separated from the frame of the device. Such a construction increases the risk of elements being lost or broken.

SUMMARY OF THE INVENTION

It is an object of the present invention to provide a volumetric apparatus for accurately portioning fluidic material into fractions of a predetermined size without requiring the use of two separate valves and without the necessity for special equipment to coordinate the opening and closing operations of the inlet and outlet of a portioning housing.

It is another object of the invention to provide a portioning apparatus which is pneumatically operated and which conserves pneumatic fluid by transferring pneumatic fluid from the housing to a storage tank during a material feeding operation and transferring pneumatic fluid back to the housing to carry out a material delivery operation.

Further, it is an object of the present invention to provide a portioning apparatus which is easy to use and clean, and permits the interior of the housing, as well as the valve means within the housing, to be exposed for cleaning after a portioning operation is carried out without requiring that parts be physically removed from the apparatus.

It is also an object of the invention to provide a method of portioning fluidic material into fractions of predetermined size which may be accurately adjusted to any desired value.

In accordance with one aspect of the invention, a volumetric apparatus for portioning fluidic material into fractions of predetermined size includes a housing including first and second axial ends and an inlet and outlet located adjacent one of the axial ends, inlet and outlet opening means for opening and closing the inlet and outlet, and a piston movable in the housing and including first and second surfaces, the first surface defining a product portioning chamber in the housing and the second surface defining a compression chamber in the housing. Feeding means are provided for feeding fluidic material into the product portioning chamber through the inlet under pressure when the inlet is open and the outlet is closed. The pressurized fluidic material forces the piston from a first position adjacent the one axial end of the housing to a second position removed from the first position by a preset distance such that a predetermined volume of the fluidic material is fed into the product portioning chamber.

Piston driving means are also provided in the inventive apparatus for driving the piston from the second position to the first position when the inlet is closed and the outlet is open so as to deliver the fluidic material from the product portioning chamber through the outlet. The piston driving means includes a storage chamber, pneumatic fluid, and pneumatic fluid transfer means for transferring the pneumatic fluid from the compression chamber to the storage chamber under pressure when the piston is forced from the first position to the second position and for transferring the pneumatic fluid from the storage chamber to the compression chamber under pressure when the inlet is closed and the outlet is open, the pneumatic fluid driving the piston to the first position as the fluid is transferred under pressure to the compression chamber.

According to another aspect of the invention, an apparatus includes a support frame having a horizontally disposed support surface, a housing supported above the support surface and including upper and lower axial ends and an inlet and outlet located adjacent the lower axial end, and a piston movable in the housing and including first and second surfaces, the first surface defining a lower product portioning chamber in the housing and the second surface defining an upper compression chamber in the housing. A valve is supported on the support surface for rotation relative thereto and valve operating means are provided for rotating the valve between a feeding position and a delivery position and valve accessing means open the housing and expose the valve to permit cleaning of the housing and valve when the apparatus is not being used in the portioning of fluidic material. The valve accessing means includes lifting means for lifting the housing relative to the support surface and valve in order to expose the valve and housing for cleaning.

BRIEF DESCRIPTION OF THE DRAWINGS

A preferred embodiment of the inventive portioning apparatus is discussed in detail below with reference to the attached drawing figures, wherein.

DESCRIPTION OF THE PREFERRED EMBODIMENT

Figure 2:
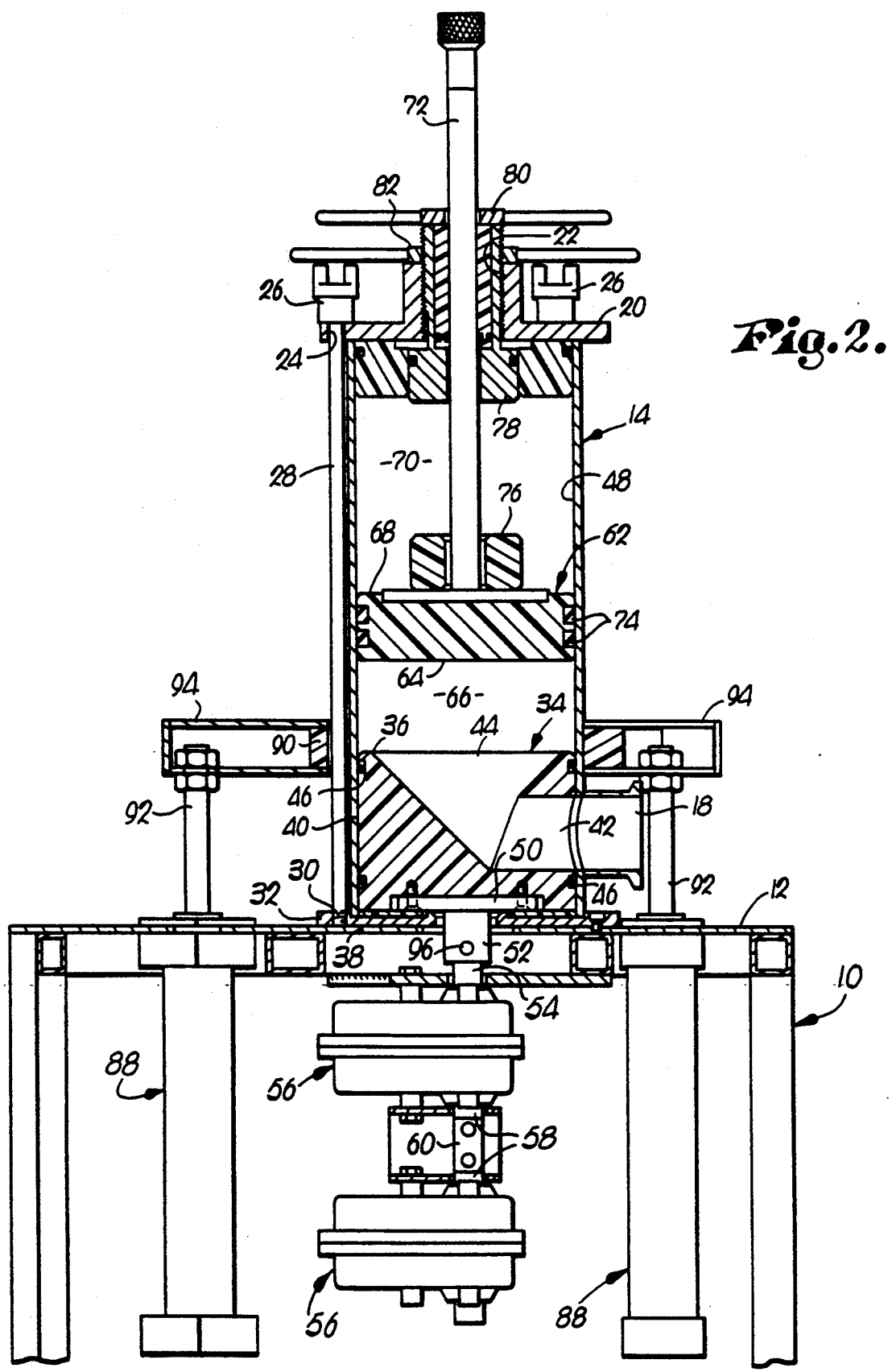
FIG. 2 is an elevated side section view of the apparatus taken along line 2—2 of FIG. 1.

A preferred embodiment of a volumetric apparatus used for the portioning of foodstuffs and other fluidic materials is illustrated in FIG. 2.

Figure 1:
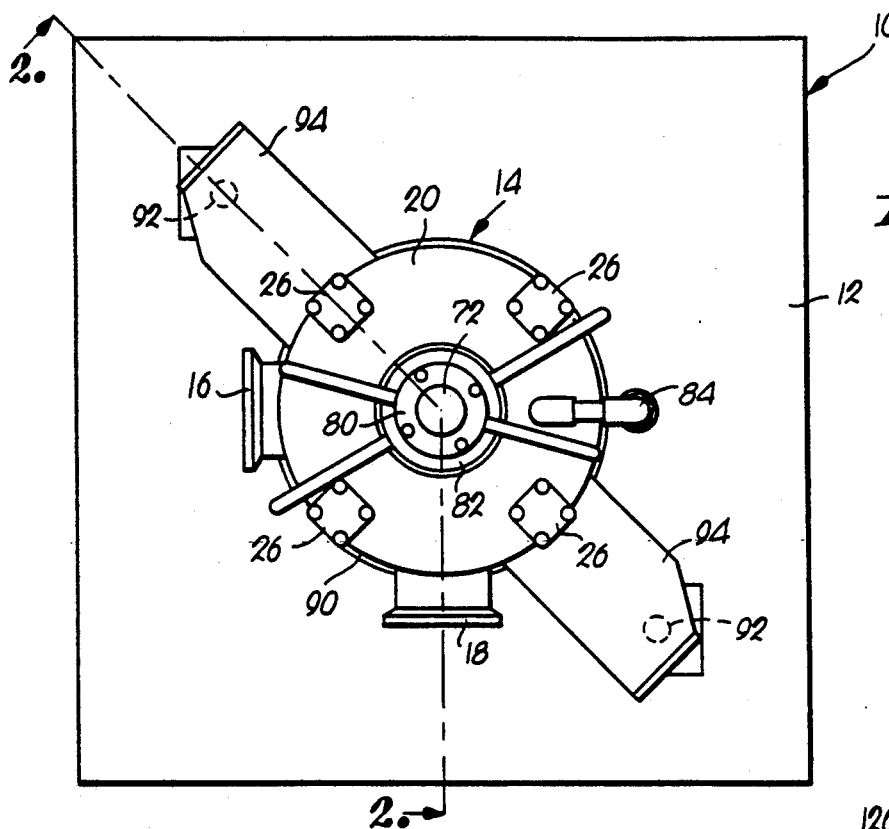
FIG. 1 is a top plan view of a portioning apparatus constructed in accordance with the invention.

As shown, the apparatus includes a support frame 10 having a horizontally disposed support surface 12, and a cylindrical housing 14 carried on the support surface. The housing 14 includes an inlet 16 and an outlet 18, both of which are illustrated in FIG. 1. The inlet and outlet are disposed adjacent a lower open end of the housing 14 such that the central axes of the inlet and outlet are disposed in a common horizontal plane and are substantially perpendicular to one another as shown in FIG. 1.

The upper end of the housing 14 is closed off by a cover 20 having a central threaded bore 22 and four openings 24 disposed along the peripheral edge therof. The relative positions of these four openings 24 is illustrated in FIG. 1, wherein upper ends 26 of four positioning rods 28 are shown as extending through the openings and downward along the side of the housing 14. Returning to FIG. 2, the rods 28 are shown as including threaded lower ends 30 which are threaded into bores in a mounting plate 32 of the support surface 12 and which serve to hold the housing 14 and the cover 20 in place relative to one another and to the support frame 10.

A valve 34 is supported on the mounting plate 32 of the support surface 12 for rotation relative to the support surface, and includes top and bottom surfaces 36, 38 separated by a single peripheral side surface 40. A first opening 42 is provided in the peripheral side surface 40 of the valve and extends through the valve to a second opening 44 which is provided in the top surface 36 and which opens up to the interior of the housing 14 when the apparatus is in the operating position shown in FIG. 2.

The valve 34 is shaped to provide a smooth directional transition between the two openings 42, 44 in the valve 34 and to remove as many sharp edges as possible in the elbow-shaped passage therein. In addition, the opening 44 in the top surface of the valve extends across substantially the entire surface in order to minimize the amount of dead area which might catch and retain foodstuffs and the like during a portioning operation. Also, two sealing rings 46 are provided in grooves formed in the periphery of the seal, the rings providing a seal between the valve 34 and an inner surface 48 of the housing to prevent escape of foodstuffs.

The bottom surface 38 of the valve 34 is secured to a plate 50 having a coupling element 52 thereon for engagement with a shaft 54 of a valve operating means for rotating the valve 34 between a feeding position in which the first opening 42 is aligned with the inlet 16 of the housing and the outlet 18 is blocked by the peripheral surface 40 of the valve, and a delivery position in which the first opening 42 is aligned with the outlet 18 and the inlet 16 is blocked by the peripheral surface 40.

In the preferred embodiment, the valve operating means includes a pair of paddle devices 56, each including a shaft 58 having a paddle thereon disposed in an air tight chamber and oriented to be pivotable between two lateral positions such that the shaft may be rotated between two corresponding rotational positions. Although the paddles are not illustrated in FIG. 2, they are shown schematically in the paddle devices 56 illustrated in FIG. 4. The shafts 58 of the two paddle devices 56 are ganged together by a coupling 60 and are connected to a common pneumatic control in a manner described below so that the devices will operate simultaneously to move the valve 34 between the feeding and delivery positions.

Although two paddle devices 56 are employed in the preferred embodiment, it is noted that a single, relatively large paddle device could alternately be employed, as well as any other known valve operating device which will quickly and accurately rotate the valve between two rotationally offset positions.

A piston 62 is movable within the housing 14 and includes a lower surface 64 defining a product portioning chamber 66 in the housing 14 and an upper surface 68 defining a compression chamber 70. The piston 62 also includes a shaft 72 extending from the upper surface 68 through the central bore 22 of the cover 20 so that an upper portion of the shaft 72 is visible above the housing to give an indication of the position of the piston 62. Seal rings 74 are provided around the circumference of the piston which seal against the interior surface 48 of the housing 14 to prevent foodstuffs from passing from the portioning chamber 66 to the compression chamber 70 and for preventing flow of pneumatic fluid from the compression chamber 70 to the portioning chamber 66.

As will be discussed in detail below, the piston 62 is movable between a first position in contact with the top surface 36 of the valve 34 and a second position removed from the top surface of the valve by a preset distance such that a predetermined volume of the foodstuffs or other fluidic material is received into the housing. The second position of the piston 62 is set through the use of an adjustment arrangement including a coarse adjustment means and a fine adjustment means.

The coarse adjustment means includes a number of removable spacers 76, only one of which is illustrated in the figures. These spacers 76 are doughnut shaped and are provided in different heights so as to be positionable in the compression chamber 70 on the upper surface 68 of the piston 62 to modify the preset distance between the first and second positions of the piston.

An adjustable limit stop means is provided for carrying out the fine regulation of the preset distance between the first and second positions of the piston, and includes a stop element 78 disposed in the central threaded bore 22 of the cover 20 and being movable relative to the cover to regulate the upper limit of the piston movement. A wrench 80 is attached to the upper end of the stop element 78 to permit the element to be rotated in the threads of the central bore 22, and a lock wrench 82 is threaded to be received on the stop element to secure the element in place once the element has been threaded to a desired position relative to the cover 20 so as to accurately limit the range of movement of the piston 62 in the upward direction.

By providing this adjustment arrangement, it is possible to make large adjustments in the volume of material to be portioned in each portioning operation carried out with the apparatus by positioning a spacer 76 of a desired size on the upper surface 68 of the piston 62, as well as to accurately regulate the volume of material delivered from the apparatus by altering the position of the stop element 78.

The compression chamber 70 is sealed adjacent the interface between the cover 20 and the housing 14 as well as between the stop element 78 and the cover to prevent pneumtic fluid from escaping from the upper end of the housing 14. As shown in FIG. 1, a pneumatic fluid tap 84 extends through the cover 20 into the housing 14 and permits the flow of pneumatic fluid into and out of the compression chamber 70 during movement of the piston. Although not shown in detail, a storage or accumulator tank 86 is mounted on the frame 10 and is connected to the pneumatic fluid tap 84, as shown schematically in FIG. 4. The function of the accumulator tank 86 is discussed with reference to the operation of the apparatus.

Returning to FIG. 3, a pair of pneumatic cylinder assemblies 88 are shown which make up a portion of a valve accessing means for opening the housing 14 and exposing the valve 34 to permit cleaning of the housing and valve when the apparatus is not being used in the portioning of fluidic material. The pneumatic cylinder assemblies 88 are operable to lift the housing relative to the valve to expose the valve and the interior of the housing for cleaning.

The housing is provided with an annular flange 90 which is securely fastened to the outer surface of the housing and which is connected to the pistons 92 of the cylinder assemblies 88 through brackets 94 secured to the flange. When it is desired to lift the housing, the pneumatic cylinder assemblies 88 are simultaneously actuated, and the housing is lifted from the support surface 12 revealing the valve and interior surface of the portioning chamber to the operator.

The valve 34 is retained on the support surface 12 during the lifting operation by the coupling between the valve and the shaft, which includes a pin 96 extending through both the shaft 54 and the coupling element 52 of the plate. Although not shown in the figures, it is possible to provide a conventional biased slip joint connection between the valve and the shaft so as to permit some limited upward movement of the valve relative to the support surface for enabling cleaning of the support surface and the bottom surface of the valve.

Figure 4:
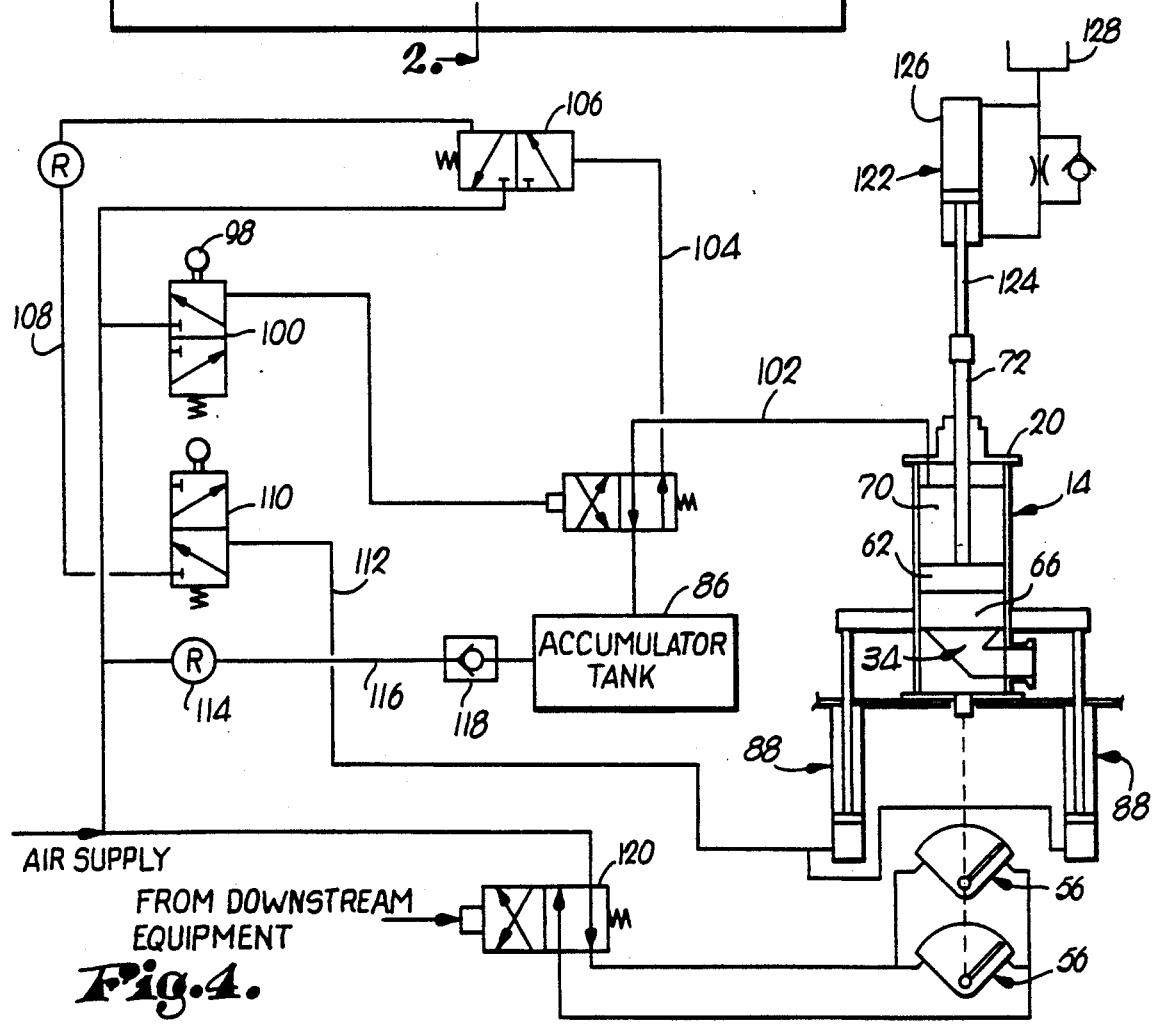
FIG. 4 is a schematic view of a further embodiment of the apparatus and of the pneumatic system used to control certain operations of the apparatus.

A safety feature which may also be provided on the apparatus for use in connection with the lifting means is illustrated in FIG. 4, and includes a number of pneumatic control expedients which ensure that any pressure in the compression chamber 70 is relieved prior to actuation of the pneumatic cylinder assemblies 88. As can be seen from the figure, an on-off switch 98, shown in the "off" position in the figure, controls the position of a control valve 100 in the line 102 between the compression chamber 70 and the accumulator tank 86 such that when the switch 98 is turned on, the pneumatic fluid in the compression chamber 70 is released and the fluid in the accumulator tank 86 is delivered through a line 104 and actuates a control valve 106. This control valve 106, when actuated by the fluid from the accumulator tank 86, opens a line 108 to a pneumatic fluid supply so that pressurized fluid reaches an up-down control valve 110, shown in the "down" position in the figure. When the up-down valve 110 is moved to the "up" position, the fluid flows into the line 112 and forces the pistons 92 upward to lift the housing assuming the threaded ends of the rods have been removed from engagement with the plate.

Thereafter, if a portioning operation is to be carried out, the pneumatic cylinder assemblies 88 must be lowered and deactivated, by lowering the housing and turning the on-off switch 98 to the "off" position. Only then will it be possible to re-pressurize the compression chamber 70 without the fluid in the chamber being exhausted to atmosphere.

The portioning operation of the apparatus of the preferred embodiment will also be discussed with reference to FIG. 4. Assuming the housing 14 and valve 34 have been cleaned and the housing lowered and secured into place on the support surface 12, and that the pneumatic cylinder assemblies 88 have been turned off, then the pneumatic system will be as shown in the figure.

Also at this time, when no material is being fed into the housing 14, the piston 62 will be resting against the top surface 36 of the valve 34 under the weight of the piston and the pressure which is exerted on the piston by the pneumatic fluid in the compression chamber 70. The level of pressure in the compression chamber is controlled by a regulator 114 provided in an inlet line 116 of the accumulator tank 86 and is maintained at a minimum by the regulator 114 and by a one-way valve 118 in line with the regulator.

When it is desired to carry out a portioning operation, foodstuffs or other fluidic material capable of being pumped through a pipe is forced toward the inlet of the housing under pressure, e.g. by any one of a number of different types or models of pumps such as the Model V629 or Model 7000 pumps presently marketed by Marlen Research Corporation. When the valve 34 is in the delivery position, the inlet 16 to the housing is closed and no material is permitted to enter the housing. However, when in the feeding position, the first opening in the valve is aligned with the inlet and material is pumped under pressure into the housing with enough force to lift the piston 62 from the top surface 36 of the valve and push the piston upward until the spacer 76, if present, contacts the stop element 78 and prevents further upward movement of the piston.

During the movement of the piston 62 towards its raised second position, the pneumatic fluid in the compression chamber 70 is transferred from the compression chamber to the accumulator tank 86 through the tap 84 and line 102 and is stored under increased pressure until such time as it is able to pass back into the compression chamber 70. In this manner, the pneumatic fluid is conserved thus reducing the cost of operation of the apparatus.

When an operator or other conventional switching means downstream of the apparatus signals for a portioned fraction of the material to be delivered from the apparatus, a control valve 120 is actuated, moving to the right, and the paddle devices 56 operate to rotate the valve 34 from the feeding position to the delivery position. Once the first opening 42 of the valve moves into alignment with the outlet 18, the increased pressure of the pneumatic fluid in the compression chamber 70 and accumulator tank 86 exerts a sufficient force on the piston 62 to drive the piston from the raised second position toward the first position in engagement with the top surface 36 of the valve, thus pushing the portioned material from the housing through the outlet 18 to a downstream station where the material is either packaged or treated in some further operation. Once the material has been delivered and the piston 62 is in the first position, the control valve 120 is returned to the position shown in FIG. 4, and the valve 34 rotates back to the feeding position to receive another fraction of the material being pressed through the pipe at the inlet.

Although not shown in the drawing, it is possible to provide sensing means for sensing when the piston is in the second position and actuating means for actuating the valve operating means in response to the sensing means. By providing such an arrangement, it is possible to connect the portioning apparatus to a downstream handling apparatus which is capable of operating at a speed faster than the portioning apparatus without a risk of the material being discharged prior to the piston being forced completely to the second position.

If after an initial portioning operation it is determined that regulation of the volume of the portioned material is necessary, the spacers 76 may be replaced or supplemented and the relative position of the stop element 78 in the central bore 22 may be adjusted, in order to change the volume of material permitted to enter the housing during subsequent operations.

Figure 3:
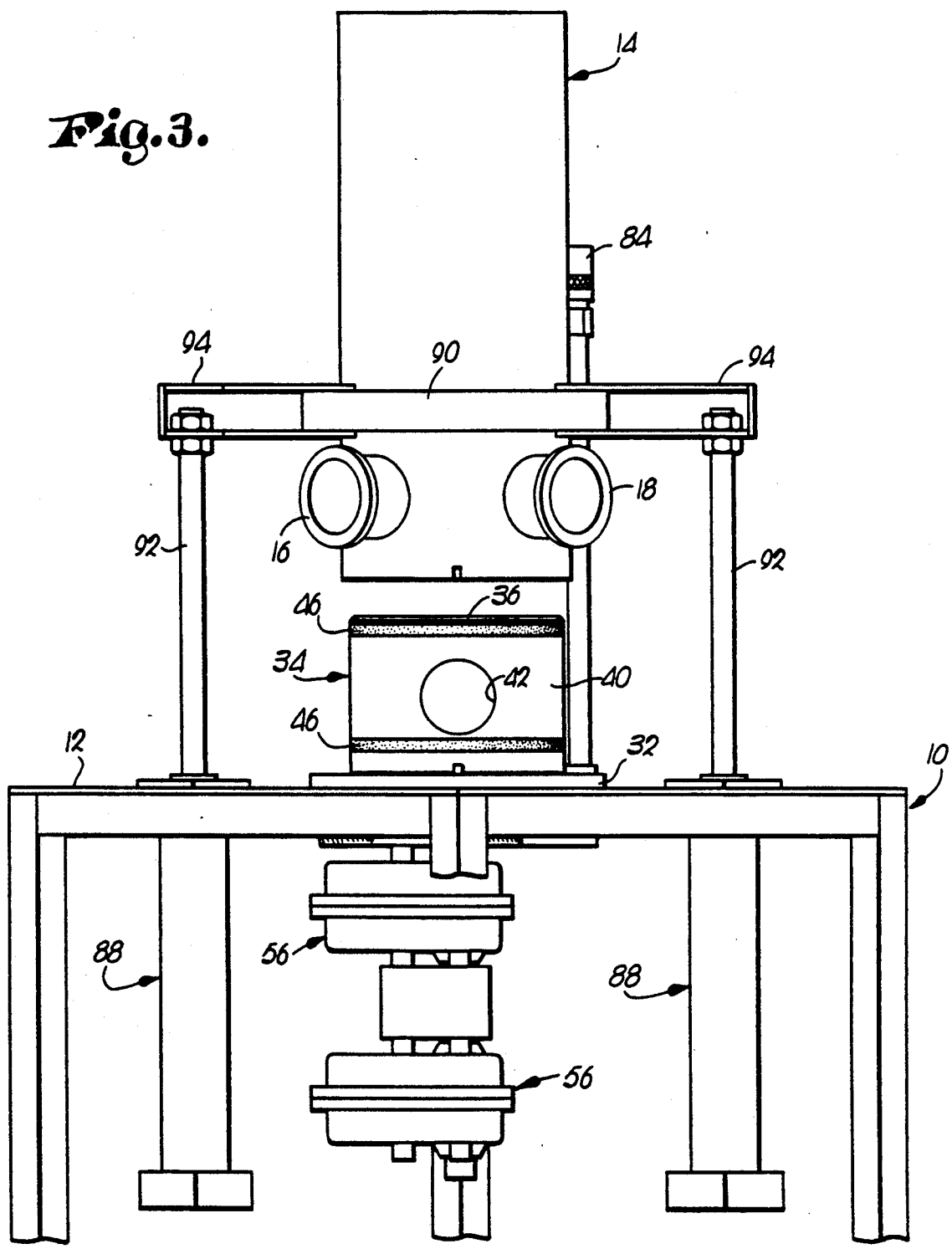
FIG. 3 is an elevated side view of the apparatus with the housing shown in a raised position relative to the support surface of the frame.

Although not shown in FIGS. 1–3, another feature of the invention which may be employed on the apparatus includes dampening means for dampening the rate of movement of the piston 62 toward the first position so as to reduce the velocity of the fluidic material as it is delivered from the product portioning chamber 66. Preferably, the dampening means includes a hydraulic cylinder assembly 122 including a piston 124 and a cylinder 126, and a hydraulic fluid supply source 128 connected to the cylinder to permit free movement of the piston 124 in the upward direction while restricting movement of the piston in the downward direction. The piston 124 is attachable to the exposed portion of the shaft 72 extending from the piston so as to restrict the movement of the piston 62 when moving from the second position toward the first position. As a result of this construction, material being delivered from the housing 14 is moved at a rate which will not injure an operator standing adjacent the outlet and which will permit easy packaging of the material.

Although the invention has been described with reference to a preferred embodiment, it is noted that equivalents may be employed and substitutions made herein without departing from the scope of the invention as set forth in the claims.

We claim:

1. A volumetric apparatus for portioning fluidic material into fractions of predetermined size, the apparatus comprising:
    a housing defining a central axis and including first and second axial ends and an inlet and outlet located adjacent one of the axial ends;
    inlet opening means for opening and closing the inlet;
    outlet opening means for opening and closing the outlet;
    a piston movable in the housing along the central axis and including first and second surfaces, the first surface defining a product portioning chamber in the housing and the second surface defining a compression chamber in the housing;
    feeding means for feeding fluidic material into the product portioning chamber through the inlet under pressure when the inlet is open and the outlet is closed, the pressurized fluidic material forcing the piston from a first position adjacent the one axial end of the housing to a second position removed from the first position by a preset distance such that a predetermined volume of the fluidic material is fed into the product portioning chamber;
    piston driving means for driving the piston from the second position when the inlet is closed and the outlet is open so as to deliver the fluidic material from the product portioning chamber through the outlet; and
    a valve which forms a part of the inlet and outlet opening means, the valve including upper and lower surfaces separated by a peripheral side surface, and first and second openings, the first opening being provided in the peripheral side surface and extending through the valve to the second opening which is provided in the upper surface, the apparatus further comprising valve operating means for rotating the valve between a feeding position in which the first opening is aligned with the inlet of the housing and the outlet is blocked, and a delivery position in which the first opening is aligned with the housing outlet and the inlet is blocked.

2. The volumetric apparatus as set forth in claim 1, further comprising removable spacer means for modifying the preset distance between the first and second positions of the piston, the removable spacer means including at least one spacer element positionable in the compression chamber between the second surface of the piston and the axial end of the housing opposite the one end to shorten the preset distance between the first and second positions of the piston.

3. The volumetric apparatus as set forth in claim 2, further comprising adjustable limit stop means for regulating the preset distance between the first and second positions of the piston, the adjustable limit stop means including a stop element disposed at the axial end of the housing opposite the one end and being movable relative to the housing to regulate the second position of the piston, wherein the removable spacer means provides a relatively coarse adjustment of the preset distance and the limit stop means provides a relatively fine regulation of the preset distance such that the predetermined volume of the fluidic material to be fed into the product portioning chamber is finely adjustable.

4. The volumetric apparatus as set forth in claim 1, further comprising valve accessing means for opening the housing and exposing the valve to permit cleaning of the housing and valve when the apparatus is not being used in the portioning of fluidic material.

5. The volumetric apparatus as set forth in claim 4, wherein the valve accessing means includes lifting means for lifting the housing relative to the valve and exposing the valve for cleaning.

6. The volumetric apparatus as set forth in claim 1, further comprising actuating means for actuating the valve operating means to rotate the valve between the feeding position and the delivery position, the actuating means including an operator activated switch.

7. The volumetric apparatus as set forth in claim 1, further comprising sensing means for sensing when the piston is in the second position and actuating means for actuating the valve operating means in response to the sensing means.

8. The volumetric apparatus as set forth in claim 1, wherein the piston driving means includes a storage chamber, pneumatic fluid, and pneumatic fluid transfer means for transferring the pneumatic fluid from the compression chamber to the storage chamber under pressure when the piston is forced from the first position to the second position and for transferring the pneumatic fluid from the storage chamber to the compression chamber under pressure when the inlet is closed and the outlet is open, the pneumatic fluid driving the piston to the first position as the fluid is transferred under pressure to the compression chamber.

9. The volumetric apparatus as set forth in claim 1, further comprising adjustable limit stop means for regulating the preset distance between the first and second positions of the piston, the adjustable limit stop means including a stop element disposed at the axial end of the housing opposite the one end and being movable relative to the housing to regulate the second position of the piston.

10. The volumetric apparatus as set forth in claim 1, further comprising dampening means for dampening the rate of movement of the piston toward the first position so as to reduce the velocity of the fluidic material as it is delivered from the product portioning chamber.

11. A volumetric apparatus for portioning fluidic material into fractions of predetermined size, the apparatus comprising:
    a support frame having a horizontally disposed support surface;
    a housing supported above the support surface and including upper and lower axial ends and an inlet and outlet located adjacent the lower axial end;
    a piston movable in the housing and including first and second surfaces, the first surface defining a lower product portioning chamber in the housing and the second surface defining an upper compression chamber in the housing;
    a valve supported on the support surface for rotation relative to the support surface, the valve including upper and lower surfaces separated by a peripheral side surface, and first and second openings, the first opening being provided in the peripheral side surface and extending through the valve to the second opening which is provided in the upper surface;
    valve operating means for rotating the valve between a feeding position in which the first opening is aligned with the inlet of the housing and the outlet is blocked, and a delivery position in which the first opening is aligned with the housing outlet and the inlet is blocked; and
    valve accessing means for opening the housing and exposing the valve to permit cleaning of the housing and valve when the apparatus is not being used in the portioning of fluidic material, the valve accessing means including lifting means for lifting the housing relative to the support surface and valve in order to expose the valve and housing for cleaning.

12. The volumetric apparatus as set forth in claim 11, wherein the valve accessing means includes at least one piston and cylinder assembly extending between the frame and the housing and being operable to lift the housing upward from the support surface by a distance sufficient to expose the valve.

13. The volumetric apparatus as set forth in claim 11, wherein the valve operating means includes a shaft connected to at least one flapper and means for forcing the at least one flapper in the circumferential direction of the shaft to rotate the valve between the feeding and delivery positions.

14. A method of portioning fluidic material into fractions of predetermined size, the method comprising the steps of:
    opening an inlet and closing an outlet of a hollow housing provided with a piston movable in the housing, the piston including first and second surfaces, the first surface defining a product portioning chamber in the housing and the second surface defining a compression chamber in the housing;
    feeding fluidic material into the product portioning chamber through the inlet under pressure, the pressurized fluidic material forcing the piston from a first position adjacent the one axial end of the housing to a second position removed from the first position by a preset distance such that a predetermined volume of the fluidic material is fed into the product portioning chamber;
    transferring pneumatic fluid which is present in the compression chamber when the piston is in the first position from the compression chamber to a storage chamber under pressure when the piston is forced from the first position to the second position;
    closing the inlet and opening the outlet; and
    transferring the pneumatic fluid from the storage chamber to the compression chamber under pressure, the pressurized pneumatic fluid driving the piston from the second position to the first position to deliver the portioned fraction of fluidic material from the product portioning chamber through the outlet,
    wherein the step of opening the inlet and closing the outlet includes rotating a valve to a feeding position in which a first opening provided in a peripheral side surface of the valve and extending through the valve to a second opening provided in an upper surface of the valve is aligned with the inlet of the housing and the outlet is blocked, and the step of closing the inlet and opening the outlet includes rotating the valve to a delivery position in which the first opening is aligned with the housing outlet and the inlet is blocked.

* * * * *